(12) United States Patent
Masuko et al.

(10) Patent No.: US 11,069,898 B2
(45) Date of Patent: Jul. 20, 2021

(54) ALL-SOLID-STATE SECONDARY BATTERY

(71) Applicant: TDK CORPORATION, Tokyo (JP)

(72) Inventors: Taisuke Masuko, Tokyo (JP); Tomohiro Yano, Tokyo (JP); Hiroshi Sato, Tokyo (JP); Masahiro Oishi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 93 days.

(21) Appl. No.: 16/464,706

(22) PCT Filed: Mar. 27, 2018

(86) PCT No.: PCT/JP2018/012540
§ 371 (c)(1),
(2) Date: May 29, 2019

(87) PCT Pub. No.: WO2018/181379
PCT Pub. Date: Oct. 4, 2018

(65) Prior Publication Data
US 2019/0341621 A1 Nov. 7, 2019

(30) Foreign Application Priority Data
Mar. 28, 2017 (JP) .............................. JP2017-063599

(51) Int. Cl.
*H01M 4/62* (2006.01)
*H01M 10/0525* (2010.01)
(Continued)

(52) U.S. Cl.
CPC ............. *H01M 4/628* (2013.01); *H01M 6/18* (2013.01); *H01M 6/181* (2013.01); *H01M 6/185* (2013.01);
(Continued)

(58) Field of Classification Search
CPC ......... H01M 6/18–187; H01M 10/056; H01M 10/0562; H01M 2300/0065
See application file for complete search history.

(56) References Cited

U.S. PATENT DOCUMENTS

2007/0259271 A1 11/2007 Nanno et al.
2009/0202912 A1 8/2009 Baba et al.
(Continued)

FOREIGN PATENT DOCUMENTS

JP 2009-181901 A 8/2009
JP 2012-49023 A 3/2012
(Continued)

OTHER PUBLICATIONS

Machine translation of JP 2009-181901 (no date).*
(Continued)

*Primary Examiner* — Amanda C. Walke
(74) *Attorney, Agent, or Firm* — Oliff PLC (57) ABSTRACT

An all-solid-state secondary battery has a positive electrode collector, a positive electrode active material layer, a negative electrode active material layer, a negative electrode collector, and a solid electrolyte. The solid electrolyte has an interlayer solid electrolyte located between the positive electrode active material layer and the negative electrode active material layer, and the all-solid-state secondary battery further includes a trapping layer that traps a metal of which at least one of the positive electrode collector and the negative electrode collector is formed.

19 Claims, 1 Drawing Sheet (51) Int. Cl.
    *H01M 10/0585* (2010.01)
    *H01M 10/056* (2010.01)
    *H01M 6/18* (2006.01)

(52) U.S. Cl.
    CPC ......... *H01M 6/187* (2013.01); *H01M 10/056* (2013.01); *H01M 10/0525* (2013.01); *H01M 10/0585* (2013.01); *H01M 2300/0065* (2013.01)

(56) References Cited

U.S. PATENT DOCUMENTS

| | | | |
|---|---|---|---|
| 2014/0038058 A1* | 2/2014 | Holzapfel | H01M 4/0471 429/319 |
| 2016/0197351 A1* | 7/2016 | Tani | H01M 4/667 429/162 |
| 2018/0062166 A1* | 3/2018 | Sasaki | H01M 10/0562 |
| 2019/0051936 A1* | 2/2019 | Meshcheryakov | H01G 11/06 |
| 2019/0081352 A1* | 3/2019 | Sasaki | H01M 4/366 |

FOREIGN PATENT DOCUMENTS

| | | | |
|---|---|---|---|
| JP | 5165843 B2 | 3/2013 | |
| JP | 2013-164971 A | 8/2013 | |
| JP | 5430930 B2 | 3/2014 | |
| JP | 2014-102911 A | 6/2014 | |
| JP | 2015-79702 A | 4/2015 | |
| JP | 2015-164116 A | 9/2015 | |
| WO | WO-2018212120 A1 * | 11/2018 | ............. H01M 4/13 |

OTHER PUBLICATIONS

Machine translation of JP 2012-049023 (no date).*
Machine translation of JP 2013-164971 (no date).*
Machine translation of JP 2015-079702 (no date).*
Translation of written opinion (ETWOS) for WO2018181379 (no date).*
Jun. 2, 2020 Office Action issued in Japanese Patent Application No. 2019-509926.
Jun. 26, 2018 International Search Report issued in International Patent Application No. PCT/JP2018/012540.

* cited by examiner

US 11,069,898 B2

ALL-SOLID-STATE SECONDARY BATTERY

TECHNICAL FIELD

The present disclosure relates to an all-solid-state secondary battery, and particularly, to an all-solid-state lithium ion secondary battery.

Priority is claimed on Japanese Patent Application No. 2017-63599, filed Mar. 28, 2017, the content of which is incorporated herein by reference.

BACKGROUND ART

Recently, batteries have been used in various applications and, for example, as power supplies for portable electronic devices. With the remarkable development of electronics technology, portable electronic devices are reduced in size and weight, are reduced in thickness, and are increased in function. Accordingly, batteries serving as power supplies for electronic devices are also strongly requested for a reduction in size and weight, a reduction in thickness, and an improvement in reliability. Since batteries using electrolytes contain liquids of organic substances, concerns about liquid leakage, depletion of the liquid, etc. are not resolved. Thus, an all-solid-state secondary battery using a solid electrolyte is attracting attention.

For example, an all-solid-state lithium ion secondary battery made by a manufacturing method of forming each member in a sheet form using an oxide-based solid electrolyte that is stable in air, laminating the members to form a laminate, and then firing the laminate at the same time is disclosed in Patent Document 1. In the all-solid-state lithium ion secondary battery of Patent Document 1, silver (Ag), palladium (Pd), gold (Au), and platinum (Pt) that are expensive metals are used as a positive electrode collector layer and a negative electrode collector layer.

Meanwhile, for example, an all-solid-state lithium ion secondary battery made by a manufacturing method of firing a laminate in a reducing atmosphere using copper (Cu) more inexpensive than the metals of Patent Document 1 as a positive electrode collector layer and a negative electrode collector layer is disclosed in Patent Document 2. However, in a case where Cu is used as a collector, Cu may be diffused into the laminate from a collector layer due to heat treatment during firing, and be precipitated onto a surface of the laminate of the all-solid-state lithium ion secondary battery as a metal. A problem with the diffusion of Cu can also occur during debinding performed before the firing (treatment of thermally decomposing a binder contained in an unfired compact). If, by any chance, a large quantity of metal Cu is precipitated onto the surface, this can cause a short circuit between external terminals.

CITATION LIST

Patent Literature

Patent Document 1

Japanese Patent No. 5430930

Patent Document 2

Japanese Patent No. 5165843

SUMMARY OF INVENTION

Technical Problem

The present invention was made in view of the above problems, and an object thereof is to provide an all-solid-state secondary battery having higher reliability.

Solution to Problem

The inventors of the present invention have found that an all-solid-state secondary battery includes a trapping layer for trapping a metal diffused from a collector during debinding and firing, and thus precipitation of the metal onto a surface of a laminate can be prevented or suppressed. That is, the present invention provides the following means in order to solve the above problems.

An all-solid-state secondary battery according to an aspect of the present invention includes a positive electrode collector, a positive electrode active material layer, a negative electrode active material layer, a negative electrode collector, and a solid electrolyte. The solid electrolyte has an interlayer solid electrolyte located between the positive electrode active material layer and the negative electrode active material layer, and the all-solid-state secondary battery further includes a trapping layer configured to trap a metal of which at least one of the positive electrode collector and the negative electrode collector is formed.

In the all-solid-state secondary battery according to the aspect, the trapping layer may contain one or more metal elements selected from the group consisting of Cr, Mn, Fe, Co, Ni, and Zn.

In the all-solid-state secondary battery according to the aspect, the trapping layer may contain one or more of the group consisting of a metal, an alloy, an oxide, and a phosphorus oxide.

In the all-solid-state secondary battery according to the aspect, a thickness of the trapping layer may be within a ratio range between 0.003 and 6.67 with respect to a thickness of at least one of the positive electrode collector and the negative electrode collector.

In the all-solid-state secondary battery according to the aspect, the solid electrolyte may further have an outermost solid electrolyte located outside at least one of the positive electrode collector and the negative electrode collector, and the trapping layer may be located inside the outermost solid electrolyte.

In the all-solid-state secondary battery according to the aspect, the positive electrode collector, the positive electrode active material layer, the negative electrode active material layer, the negative electrode collector, and the solid electrolyte may have a relative density of 80% or more.

Advantageous Effects of Invention

According to the aspect of the present invention, reliability of the all-solid-state secondary battery can be further improved by prevention of precipitation of a metal on a surface of a laminate of the all-solid-state secondary battery or a reduction in amount of precipitation.

DESCRIPTION OF EMBODIMENTS

Hereinafter, the present embodiment will be described in detail while properly referring to the drawing. The drawing used in the following description may show characterized portions in a larger size for convenience to facilitate understanding of the features of the present embodiment, and dimension ratios or the like of the components may be different from reality. Materials, dimensions, etc. exemplified in the following description are examples, and the present embodiment is not limited thereto, but may be implemented with appropriate modifications without departing from the spirit thereof.

Examples of an all-solid-state secondary battery include an all-solid-state lithium ion secondary battery, an all-solid-state sodium ion secondary battery, an all-solid-state magnesium ion secondary battery, and so on. Hereinafter, the all-solid-state lithium ion secondary battery will be described by way of example, but the present invention can be applied generally to all-solid-state secondary batteries.

Figure 1:
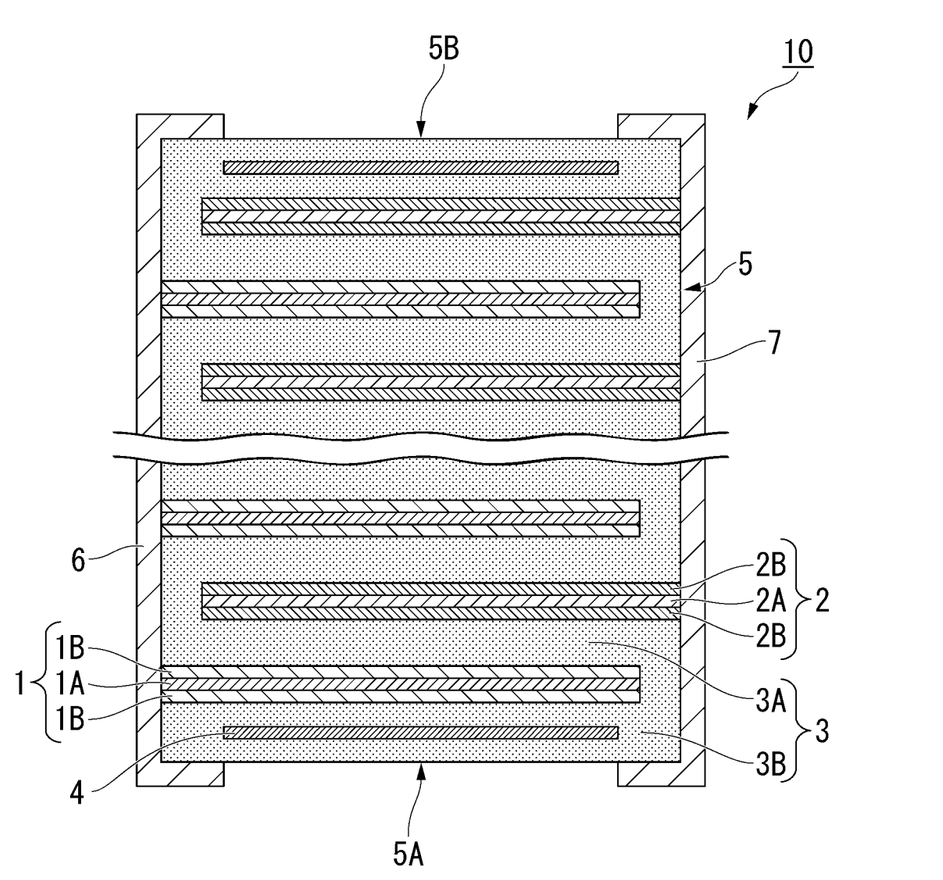
FIG. 1 is a sectional schematic diagram of an all-solid-state secondary battery according to the present embodiment.

FIG. 1 is a sectional schematic diagram in which major portions of an all-solid-state lithium ion secondary battery according to the present embodiment are enlarged. As shown in FIG. 1, an all-solid-state lithium ion secondary battery 10 includes a laminate 5 having a first electrode layer 1, a second electrode layer 2, a solid electrolyte 3, and a trapping layer 4.

The all-solid-state lithium ion secondary battery 10 is an all-solid-state secondary battery that has a positive electrode collector 1A, a positive electrode active material layer 1B, a negative electrode active material layer 2B, a negative electrode collector 2A, and a solid electrolyte 3 and is characterized in that the solid electrolyte 3 has an interlayer solid electrolyte 3A between the positive electrode active material layer 1B and the negative electrode active material layer 2B and further includes a trapping layer 4 that traps a metal of which at least one of the positive electrode collector 1A and the negative electrode collector 2A is formed.

The first electrode layer 1 is connected to a first external terminal 6, and the second electrode layer 2 is connected to a second external terminal 7. The first external terminal 6 and the second external terminal 7 are electric contacts with the outside.

(Laminate)

The laminate 5 has the first electrode layer 1, the second electrode layer 2, the solid electrolyte 3, and the trapping layer 4. Any one of the first electrode layer 1 and the second electrode layer 2 functions as a positive electrode, and the other functions as a negative electrode. Polarities of the electrode layers vary depending on which polarity is connected to the external terminal. Hereinafter, to facilitate understanding, the first electrode layer 1 is used as a positive electrode layer 1, and the second electrode layer 2 is used as a negative electrode layer 2.

The positive and negative electrode layers 1 and 2 of the laminate 5 are mutually laminated via the solid electrolyte 3 (more specifically, the interlayer solid electrolyte 3A). The all-solid-state lithium ion secondary battery 10 is charged/discharged by giving/receiving lithium ions between the positive electrode layer 1 and the negative electrode layer 2 via the solid electrolyte 3.

(Positive Electrode Layer and Negative Electrode Layer)

The positive electrode layer 1 has a positive electrode collector 1A and a positive electrode active material layer 1B including a positive electrode active material. The negative electrode layer 2 has a negative electrode collector 2A and a negative electrode active material layer 2B including a negative electrode active material.

Each of the positive electrode collector 1A and the negative electrode collector 2A is formed of at least one material having high conductivity. Examples of the high-conductivity material include, for example, a metal or an alloy including at least one metal element of silver (Ag), palladium (Pd), gold (Au), platinum (Pt), aluminum (Al), cobalt (Co), tin (Sn), copper (Cu), and nickel (Ni). When manufacturing costs are also considered in addition to the high conductivity, copper and nickel are preferable among these metal elements. Furthermore, copper does not readily react with the positive electrode active material, the negative electrode active material, or the solid electrolyte. For this reason, when copper is used in the positive electrode collector 1A and the negative electrode collector 2A, internal resistance of the all-solid-state lithium ion secondary battery 10 can be reduced. The materials of which the positive electrode collector 1A and the negative electrode collector 2A are formed may be identical to each other or different from each other. Thicknesses of the positive electrode collector 1A and the negative electrode collector 2A are, for example, within a range from 0.5 µm to 30 µm.

The positive electrode active material layer 1B is formed on one or both surfaces of the positive electrode collector 1A. For example, the positive electrode layer 1 located at an uppermost layer of the all-solid-state lithium ion secondary battery 10 in a laminating direction is not provided with the negative electrode layer 2 facing the positive electrode layer 1 at an upper side in the laminating direction. For this reason, at the positive electrode layer 1 located at the uppermost layer of the all-solid-state lithium ion secondary battery 10, it is sufficient for the positive electrode active material layer 1B to be only on one surface at a lower side in the laminating direction, but the positive electrode active material layer 1B being on both surfaces also causes no particular problems. Like the positive electrode active material layer 1B, the negative electrode active material layer 2B is also formed on one or both surfaces of the negative electrode collector 2A. The thicknesses of the positive electrode active material layer 1B and the negative electrode active material layer 2B are preferably within a range from 0.5 µm to 5.0 µm. By setting the thicknesses of the positive electrode active material layer 1B and the negative electrode active material layer 2B to 0.5 µm or more, the capacitance of the all-solid-state lithium ion secondary battery can be increased. On the other hand, by setting the thicknesses to 5.0 µm or less, diffusion distances of lithium ions are reduced. Thus, the internal resistance of the all-solid-state lithium ion secondary battery can be further reduced.

The positive electrode active material layer 1B and the negative electrode active material layer 2B contain a positive electrode active material and a negative electrode active material that give/receive lithium ions and electrons, respectively. In addition to these electrode active materials, the electrode active material layers may contain a conductive assistant or the like. It is preferable that the positive electrode active material and the negative electrode active material be able to efficiently insert and extract lithium ions.

There is no clear distinction between the active materials of which the positive electrode active material layer 1B and the negative electrode active material layer 2B are formed, and in comparison with potentials of two types of compounds, a compound exhibiting a nobler potential can be used as the positive electrode active material, and a compound exhibiting a baser potential can be used as the negative electrode active material. For this reason, the active materials will be described together below.

A transition metal oxide, a transition metal composite oxide, etc. can be used as the active material. For example, examples of the transition metal oxide and the transition metal composite oxide include lithium-manganese composite oxides ($Li_2Mn_nMa_{1-a}O_3$ (where $0.8 \le a \le 1$, Ma=Co, Ni)), lithium cobaltate ($LiCoO_2$), lithium nickelate ($LiNiO_2$), lithium manganese spinel ($LiMn_2O_4$), composite metal oxides represented by a general formula of $LiNi_xCo_yMn_zO_2$ (where x+y+z=1, $0 \le x \le 1$, $0 \le y \le 1$, $0 \le z \le 1$), a lithium vanadium compound ($LiV_2O_5$), olivine type $LiMbPO_4$ (where Mb is one or more elements selected from Co, Ni, Mn, Fe, Mg, Nb, Ti, Al, and Zr), vanadium lithium phosphate ($Li_3V_2(PO_4)_3$ or $LiVOPO_4$), Li-excess solid solution positive electrodes represented by $Li_2MnO_3$-$LiMcO_2$ (where Mc=Mn, Co, Ni), lithium titanate ($Li_4T_{15}O_{12}$), composite metal oxides represented by $Li_sNi_tCo_uAl_vO_2$ (where 0.9<s<1.3, 0.9<t+u+v<1.1), and so on.

The positive electrode collector 1A and the negative electrode collector 2A may contain a positive electrode active material and a negative electrode active material. A content ratio of the active materials contained in these collectors is not particularly limited as long as the collectors function as collectors. For example, the positive electrode collector/the positive electrode active material, or the negative electrode collector/the negative electrode active material preferably have a volume ratio that is within a range of 90/10 to 70/30.

Since the positive electrode collector 1A and the negative electrode collector 2A contain the positive electrode active material and the negative electrode active material, adhesion of the positive electrode collector 1A and the positive electrode active material layer 1B, and adhesion of the negative electrode collector 2A and the negative electrode active material layer 2B are improved.

(Solid Electrolyte)

As shown in FIG. 1, the solid electrolyte 3 has an interlayer solid electrolyte 3A located between the positive electrode active material layer 1B and the negative electrode active material layer 2B.

Further, the solid electrolyte 3 may further have an outermost solid electrolyte 3B located outside at least one (both in FIG. 1) of the positive electrode layer 1 (the positive electrode collector 1A) and the negative electrode layer 2 (the negative electrode collector 2A). Here, "outside" refers to outside the positive electrode layer 1 or the negative electrode layer 2 closest to a surface 5A or 5B of the laminate 5.

The solid electrolyte 3 may not have the outermost solid electrolyte 3B, and in this case, the surfaces 5A and 5B of the laminate 5 become the positive electrode layer 1 and the negative electrode layer 2.

A material having low conductivity of electrons and high conductivity of lithium ions is preferably used in the solid electrolyte 3. The solid electrolyte is preferably at least one selected from the group consisting of, for example, perovskite type compounds such as $La_{0.5}Li_{0.5}TiO_3$, LISICON type compounds such as $Li_{14}Zn(GeO_4)_4$, garnet type compounds such as $Li_7La_3Zr_2O_{12}$, NASICON type compounds such as $Li_{1.3}Al_{0.3}Ti_{1.7}(PO_4)_3$, $Li_{1.5}Al_{0.5}Ge_{1.5}(PO_4)_3$, etc., thio-LISICON type compounds such as $Li_{3.25}Ge_{0.25}P_{0.75}S_4$, $Li_3PS_4$, etc., glass compounds such as $Li_2S$—$P_2S_5$, $Li_2O$—$V_2O_5$—$SiO_2$, etc., and phosphate compounds such as $Li_3PO_4$, $Li_{3.5}Si_{0.5}P_{0.5}O_4$, $Li_{2.9}PO_{3.3}N_{0.46}$, etc.

Further, the solid electrolyte 3 is preferably selected in combination with the active material used in the positive electrode layer 1 and the negative electrode layer 2. For example, the solid electrolyte 3 more preferably contains the same element as the element of which the active material is formed. The solid electrolyte 3 contains the same element as the element of which the active material is formed, and thereby junctions on interfaces between the positive electrode active material layer 1B and the solid electrolyte 3 and between the negative electrode active material layer 2B and the solid electrolyte 3 are strengthened. Further, contact areas on the interfaces between the positive electrode active material layer 1B and the solid electrolyte 3 and between the negative electrode active material layer 2B and the solid electrolyte 3 can be widened.

The thickness of the interlayer solid electrolyte 3A is preferably within a range between 0.5 μm and 20.0 μm. By setting the thickness of the interlayer solid electrolyte 3A to 0.5 μm or more, a short circuit between the positive electrode layer 1 and the negative electrode layer 2 can be reliably prevented. Further, by setting the thickness of the interlayer solid electrolyte 3A to 20.0 μm or less, travel distances of lithium ions are shortened, and thus the internal resistance of the all-solid-state lithium ion secondary battery can be further reduced.

The thickness of the outermost solid electrolyte 3B is not particularly limited, but it may be, for example, within the range of the thickness of the interlayer solid electrolyte 3A, that is, within a range between 0.5 μm and 20.0 μm.

(Trapping Layer)

As will be described below in greater detail, the trapping layer 4 is a layer that contains the metal of which at least one of the positive electrode collector 1A and the negative electrode collector 2A is formed, in addition to a material of which the trapping layer 4 itself is originally formed. In a case where the positive electrode collector 1A and/or the negative electrode collector 2A contains this metal, this metal is incorporated into the trapping layer 4 in a process of manufacturing the all-solid-state secondary battery according to the present embodiment, and becomes a part forming the trapping layer 4.

The trapping layer 4 is a layer for impeding or inhibiting precipitation of the metals diffused from the positive electrode collector 1A and the negative electrode collector 2A during debinding and firing onto the surface of the laminate 5. For this reason, the trapping layer 4 is on a path along which the metals of which the positive electrode collector 1A and the negative electrode collector 2A are formed are diffused toward the surface of the laminate 5, and is particularly in the solid electrolyte 3. The trapping layer 4 may be in the interlayer solid electrolyte 3A or the outermost solid electrolyte 3B. To efficiently trap the metals diffused toward the surface of the laminate 5 from both of the positive electrode collector 1A and the negative electrode collector 2A, the trapping layer 4 is preferably in the outermost solid electrolyte 3B.

A detailed mechanism by which the metals of which the collectors are formed are diffused during debinding and firing is unknown. However, it is conceivable that the metals diffused from the collectors are propagated in the active material and the solid electrolyte and are precipitated onto the surface of the laminate 5. If, by any chance, an amount of the metals precipitated onto the surface of the laminate 5 is increased, this causes a short circuit between the first external terminal 6 and the second external terminal 7 when the first external terminal 6 and the second external terminal 7 are mounted. It is desirable to avoid or reduce the precipitation of the metals onto the surface of the laminate 5 to the extent that a short circuit does not occur. Further, it is conceivable that at least some of the metals diffused from the collectors react with oxygen contained in the active material and the solid electrolyte to form an oxidized metal, and the oxidized metal is precipitated onto the surface of the laminate 5. Since the oxidized metal precipitated onto the surface is also reduced to a metal in a reducing atmosphere, the oxidized metal causes a short circuit.

The material of which the trapping layer 4 is formed is selected from materials that are not easily diffused into the solid electrolyte 3 compared to the metals of which the positive electrode collector 1A and the negative electrode collector 2A are formed, and materials that react with the metals of which the positive electrode collector 1A and the negative electrode collector 2A are formed to form a compound or an alloy. For example, the trapping layer 4 contains one or more metal elements selected from the group consisting of chromium (Cr), manganese (Mn), iron (Fe), cobalt (Co), nickel (Ni), zinc (Zn), lithium (Li), lanthanum (La), titanium (Ti), and vanadium (V). Among the metal elements, Cr, Mn, Fe, Co, Ni, and Zn are preferable.

The metal element of which the trapping layer 4 is formed is contained in the trapping layer 4 as one or more of the group consisting of a metal, an alloy, an oxide, and a phosphorus oxide. For example, in a case where Fe is selected as the metal element, the metal element is contained in the trapping layer 4 as one or more of the group consisting of metal Fe, a Fe—Cr alloy, an iron oxide ($Fe_2O_3$), and iron phosphate ($FePO_4$). Especially in a case where an oxide is contained in the trapping layer 4, the oxide is preferable because oxygen contained in the trapping layer 4 reacts with the metals diffused from the positive electrode collector 1A and the negative electrode collector 2A to form an oxide.

Ni that can be the metal of which the trapping layer 4 is formed can also be the metal of which the positive electrode collector 1A and the negative electrode collector 2A are formed. Since it is more difficult for Ni to be diffused than Cu, Ni may be used in the trapping layer 4 in a case where the positive electrode collector 1A and the negative electrode collector 2A contain Cu.

The thickness of the trapping layer 4 is preferably within a range between 0.01 μm and 20.0 μm. More preferably, the thickness of the trapping layer 4 is determined by a relationship with the thickness of the collector (particularly, the thickness of the positive electrode collector 1A or the negative electrode collector 2A located at a position closest to the trapping layer). The ratio of the thickness of the trapping layer 4 to the thickness of the collector is preferably within a range between 0.003 and 6.67. In a case where the ratio is lower than 0.003, it is not sufficient to trap the metal precipitated from the collector, and a percentage of the metal precipitated onto the surface of the laminate 5 is increased. On the other hand, in a case where the ratio is higher than 6.67, a percentage of the thickness occupied by the trapping layer 4 in the laminate 5 is too high, the number of pairs of positive and negative electrode layers 1 and 2 is reduced, and capacities thereof are reduced. In addition, peeling readily occurs on an interface between the trapping layer 4 and the solid electrolyte 3, and a probability of cracks occurring on the interface is increased.

In a case where the trapping layer 4 is in the outermost solid electrolyte 3B, the trapping layer 4 is in any of three portions of the vicinity of the surface of the laminate 5 (i.e., the vicinity of the surface 5A or 5B), the middle of the outermost solid electrolyte, and the inside of the laminate 5 (i.e. the vicinity of the active material layers B and 2B), into which the laminate is broadly divided, in a thickness direction of the outermost solid electrolyte 3B. The trapping layer 4 may be in any portion. However, to efficiently trap the metal diffused from the collector closest to the trapping layer 4, the trapping layer 4 can preferably be close to the collector, that is, in the vicinity of the active material layers 1B and 2B.

To prevent a short circuit, the trapping layer 4 is formed to prevent contact with the first external terminal 6 and the second external terminal 7. For example, the surface area of surfaces of the trapping layer 4 is smaller than that of surfaces of the positive electrode layer 1 and the negative electrode layer 2.

The trapping layer 4 is preferably a continuous film for uniformly trapping metals, but it may have another shape such as a porous shape, a mesh shape, a linear shape, or the like.

The trapping layer 4 traps the metals diffused from the positive electrode collector 1A and the negative electrode collector 2A during debinding and firing. Therefore, in the laminate 5 after the debinding and firing processes, the trapping layer 4 is already in a state where it traps and contains the metal diffused from at least one of the positive electrode collector 1A and the negative electrode collector 2A. As described above, the metal elements of which the positive electrode collector 1A and the negative electrode collector 2A are formed are in the trapping layer 4 as a compound or an alloy. For example, in a case where Cu is used as the positive electrode collector 1A and the negative electrode collector 2A and $Fe_2O$ is used as the trapping layer 4, the trapping layer 4 after firing contains $Fe_2O_3$ derived from the trapping layer 4 before firing and Cu derived from at least one of the positive electrode collector 1A and the negative electrode collector 2A, and particularly oxidized copper ($CuO$, $Cu_2O$).

(Terminals)

A material having high conductivity is preferably used in the first external terminal 6 and the second external terminal 7 of the all-solid-state lithium ion secondary battery 10. For example, sliver (Ag), gold (Au), platinum (Pt), aluminum (Al), copper (Cu), tin (Sn), or nickel (Ni) can be used. Each terminal may be a single layer or multiple layers.

(Protective Layer)

Further, the all-solid-state lithium ion secondary battery 10 may have a protective layer (not shown), which electrically, physically, and chemically protects the laminate 5 and the terminals, on a periphery of the laminate 5. Preferably, a material of which the protective layer is formed is excellent in an insulation property, durability, and moisture resistance, and is environmentally safe. For example, glass or a ceramic, or a thermosetting resin or a photocurable resin is preferably used. The material of the protective layer may be only one type or a combination of a plurality of types may be used. Further, the protective layer may be a single layer, but it preferably includes a plurality of layers. Among these, an organic-inorganic hybrid in which powders of a thermosetting resin and ceramic are mixed is particularly preferable.

(Manufacturing Method of all-Solid-State Lithium Ion Secondary Battery)

As a manufacturing method of the all-solid-state lithium ion secondary battery 10, a simultaneous firing method or a sequential firing method may be used. The simultaneous firing method is a method of laminating materials of which layers are formed and making a laminate using batch firing. The sequential firing method is a method of making layers in turn, and a firing process is performed whenever each layer is made. Using the simultaneous firing method can reduce working processes of the all-solid-state lithium ion secondary battery 10. Further, using the simultaneous firing method makes the obtained laminate 5 denser. Hereinafter, a case where the simultaneous firing method is used will be described by way of example.

The simultaneous firing method has a process of preparing pastes of materials of which the laminate 5 is formed, a process of applying and drying the pastes to make green sheets, and a process of laminating the green sheets and simultaneously firing the made laminated sheets.

First, the material of each of the positive electrode collector 1A, the positive electrode active material layer 1B, the solid electrolyte 3, the negative electrode active material layer 2B, the negative electrode collector 2A, and the trapping layer 4, all of which constitute the laminate 5, is made into a paste.

A method of making each material into a paste is not particularly limited. For example, the paste is obtained by mixing powders of the materials with a vehicle. Here, "vehicle" is a generic term for a solvent in a liquid phase. A solvent and a binder are contained in the vehicle. A paste for the positive electrode collector 1A, a paste for the positive electrode active material layer 1B, a paste for the solid electrolyte 3, a paste for the negative electrode active material layer 2B, a paste for the negative electrode collector 2A, and a paste for the trapping layer 4 are made by this method.

Next, green sheets are made. The green sheets are obtained by applying the made pastes on a base material such as polyethylene terephthalate (PET) in a desired order, drying them as needed, and then peeling off the base material. A method of applying the pastes is not particularly limited. For example, well-known methods such as screen printing, application, transfer, a doctor blade method, and so on may be adopted.

The made green sheets are piled up in a desired order by the number of laminated layers. If necessary, alignment, cutting, and so on are performed to make a laminate. In a case where a parallel type or a serial/parallel type battery is made, the alignment is preferably performed to pile up the green sheets such that end faces of the positive electrode collector 1A are not coincident with those of the negative electrode collector 2A.

In making the laminate 5, a positive electrode active material layer unit, a negative electrode active material layer unit, and a trapping layer unit to be described below may be prepared to make the laminate.

First, the paste for the solid electrolyte 3 is formed on a PET film in a sheet shape by a doctor blade method, and is dried to form a solid electrolyte sheet. The paste for the positive electrode active material layer 1B is printed on the obtained solid electrolyte sheet by screen printing, and is dried to form the positive electrode active material layer 1B.

Next, the paste for the positive electrode collector 1A is printed on the made positive electrode active material layer 1B by screen printing, and is dried to form the positive electrode collector 1A. In addition, the paste for the positive electrode active material layer 1B is again printed on the positive electrode collector 1A by screen printing, and is dried. The PET film is peeled off, and thereby the positive electrode active material layer unit is obtained.

The negative electrode active material layer unit is also made in the same procedure. In the negative electrode active material layer unit, the negative electrode active material layer 2B, the negative electrode collector 2A, and the negative electrode active material layer 2B are formed on a solid electrolyte sheet in this order.

The same is also applied to the trapping layer unit. The paste for the solid electrolyte is formed on a PET film in a sheet shape by a doctor blade method, and is dried to form a solid electrolyte sheet. The paste for the trapping layer 4 is printed on the obtained solid electrolyte sheet by screen printing, and is dried to form the trapping layer 4. The PET film is peeled off, and thereby the trapping layer unit is obtained.

A sheet of positive electrode active material layer unit and a sheet of negative electrode active material layer unit are laminated. In this case, the positive electrode active material layer 1B, the positive electrode collector 1A, the positive electrode active material layer 1B, the solid electrolyte 3, the negative electrode active material layer 2B, the negative electrode collector 2A, the negative electrode active material layer 2B, and the solid electrolyte 3 are formed in this order. The units are piled up in an offset state such that the positive electrode collector 1A of the first sheet of positive electrode active material layer unit extends only to one end face and the negative electrode collector 2A of the second sheet of negative electrode active material layer unit extends only to the other end face. Similarly, since the positive electrode active material layer unit and the negative electrode active material layer unit are alternately laminated, active material layer units laminated in a prescribed number are obtained.

Next, in a case where the trapping layer 4 is located inside the outermost solid electrolyte 3B, a solid electrolyte sheet that becomes a part of the outermost solid electrolyte 3B and has a prescribed thickness is prepared, and the trapping layer unit (including a solid electrolyte sheet that becomes the remaining portion of the outermost solid electrolyte 3B) is put on the solid electrolyte sheet. Active material layer units laminated in a prescribed number are put thereon. Similarly, the trapping layer unit and the solid electrolyte sheet having a prescribed thickness are put thereon, thereby making the laminate 5. In the laminate 5, the components are piled up in the order of a part of the outermost solid electrolyte 3B, the trapping layer 4, a part of the outermost solid electrolyte 3B, the positive electrode active material layer 1B, the positive electrode collector 1A, the positive electrode active material layer 1B, the interlayer solid electrolyte 3A, the negative electrode active material layer 2B, the negative electrode collector 2A, the negative electrode active material layer 2B, the interlayer solid electrolyte 3A . . . (omission) . . . the negative electrode active material layer 2B, the negative electrode collector 2A, the negative electrode active material layer 2B, a part of the outermost solid electrolyte 3B, the trapping layer 4, and the a part of the outermost solid electrolyte 3B. In a case where the trapping layer 4 is located inside the interlayer solid electrolyte 3A, a sheet of trapping layer unit may be sandwiched and laminated between a sheet of positive electrode active material layer unit and a sheet of negative electrode active material layer unit.

The made laminate 5 is compressed together. The compression is performed along with heating, and a heating temperature is set to, for example 40° C. to 95° C.

The compressed laminate 5 is subjected to, for example, firing by which it is heated to 600° C. to 1000° C. under nitrogen atmosphere, and thereby a sintered compact is obtained. A time for the firing is set to, for example, 0.1 to 3 hours. In place of the nitrogen atmosphere, a reducing atmosphere (e.g., a nitrogen hydrogen mixture gas) may be used.

Before the firing process, debinding may be performed as a process different from the firing process, and a binder component in the green sheets may be thermally decomposed. For example, the debinding is performed at a temperature from 300° C. to 800° C. under nitrogen atmosphere for 0.1 to 10 hours. In place of the nitrogen atmosphere, a reducing atmosphere (e.g., a nitrogen hydrogen mixture gas) may be used.

The sintered compact may be put into a cylindrical vessel along with an abrasive such as alumina, and be subjected to barreling. Thus, corners of the laminate can be chamfered. The sintered compact may be polished by sand blasting as another method. This method is preferable because only specified portions can be trimmed.

In the laminate 5 made from the sintered compact, a relative density of the solid electrolyte 3 relative to the positive electrode collector 1A, the positive electrode active material layer 1B, the negative electrode active material layer 2B, or the negative electrode collector 2A may be higher than or equal to 80%. Thus, diffusion paths of movable ions in crystals having a high relative density is readily connected, and ion conductivity is improved.

(Terminal Formation)

The first external terminal 6 and the second external terminal 7 are attached to the sintered laminate (the sintered compact) 5. The first external terminal 6 and the second external terminal 7 are formed to make electrical contact with the positive electrode collector 1A and the negative electrode collector 2A, respectively. For example, the first external terminal 6 and the second external terminal 7 can be formed on the positive electrode collector 1A and the negative electrode collector 2A that are exposed from sides of the sintered compact by a well-known means such as a sputtering method, a dipping method, a spray coating method, or the like. In a case where the terminals are formed at prescribed portions only, they are formed, for example, after masking or the like is performed with a tape.

While the embodiment of the present invention has been described in detail with reference to the drawing, components in the embodiment and combinations thereof are one example, and additions, omissions, substitutions, and other modifications of the constitution are possible without departing from the spirit of the present invention.

EXAMPLES

Example 1

(Making of Active Material)

$Li_3V_2(PO_4)_3$ made by the following method was used in positive and negative electrode active materials as the same active materials. $Li_2CO_3$, $V_2O_5$, and $NH_4H_2PO_4$ were used as starting materials, were measured to have a mole ratio of 3:2:6, were subjected to wet mixing for 16 hours by a ball mill using water as a solvent, and were dehydrated and dried. The obtained powder was calcinated in a nitrogen hydrogen mixture gas at 850° C. for 2 hours. The calcinated product was coarsely pulverized, was subjected to wet pulverization for 16 hours by a ball mill using water as a solvent, and was dehydrated and dried to obtain an active material powder. It was confirmed using an X-ray diffractometer that a composition of the made powder was $Li_3V_2(PO_4)_3$.

(Making of Active Material Paste)

An active material paste was made by adding 15 parts of ethyl cellulose as a binder and 65 parts of dihydroterpineol as a solvent to 100 parts of the active material powder, and kneading and diffusing it with three rolls.

(Making of Solid Electrolyte Sheet)

$Li_{1.3}Al_{0.3}Ti_{1.7}(PO_4)_3$ made by the following method was used as a solid electrolyte. $Li_2CO_3$, $Al_2O_3$, $TiO_2$, and $NH_4H_2PO_4$ were used as starting materials, were measured to have a mole ratio of 0.65:0.15:1.7:3, were subjected to wet mixing for 16 hours by a ball mill using water as a solvent, and were dehydrated and dried. The obtained powder was calcinated in air at 800° C. for 2 hours. The calcinated product was coarsely pulverized, was subjected to wet pulverization for 24 hours by a ball mill using water as a solvent, and was dehydrated and dried to obtain a powder of the solid electrolyte. It was confirmed using an X-ray diffractometer that a composition of the made powder was $Li_{1.3}Al_{0.3}Ti_{1.7}(PO_4)_3$.

Next, wet mixing was performed by adding 100 parts of ethanol and 200 parts of toluene as solvents to 100 parts of this powder with a ball mill. Afterward, 16 parts of polyvinyl butyral binder and 4.8 parts of benzyl butyl phthalate 4.8 were further input and mixed to prepare a solid electrolyte paste. This solid electrolyte paste was molded into a sheet by a doctor blade method using a PET film as a base material, thereby obtaining the solid electrolyte sheet. The thickness of the solid electrolyte sheet was set to 15 μm for the interlayer solid electrolyte 3A. On the other hand, with regard to the solid electrolyte sheet for the outermost solid electrolyte 3B, to enable adjustment of a position of the trapping layer 4 in a thickness direction in the outermost solid electrolyte 3B, the solid electrolyte sheet was used as a thin sheet having a thickness of 1.5 μm. These thin sheets were formed to be able to be laminated by a necessary number, and a trapping layer sheet was made to be able to be sandwiched therebetween.

(Making of Collector Paste)

The same material was used in the positive electrode collector 1A and the negative electrode collector 2A. After Cu and $Li_3V_2(PO_4)_3$ were mixed as collectors to have a volume ratio of 60:40, a collector paste was made by adding 10 parts of ethyl cellulose as a binder and 50 parts of dihydroterpineol as a solvent, and kneading and diffusing it with three rolls. The average particle diameter of Cu was 0.6 μm.

(Making of Trapping Layer Paste)

For a trapping layer paste of which a trapping layer was formed, a trapping layer forming paste was made by adding 15 parts of ethyl cellulose as a binder and 65 parts of dihydroterpineol as a solvent to 100 parts of $Fe_2O_3$ powder, and kneading and diffusing it with three rolls.

(Making of Active Material Unit)

An active material paste was printed on the solid electrolyte sheet at a thickness of 5 μm by screen printing. Next, the printed active material paste was dried at 80° C. for 5 minutes, and a collector paste was printed on the dried active material paste at a thickness of 5 μm by screen printing. Next, the printed collector paste was dried at 80° C. for 5 minutes, and the active material paste was again printed on the dried collector paste at a thickness of 5 μm by screen printing. The printed active material paste was dried at 80° C. for 5 minutes, and then a PET film was peeled off. In this way, a sheet of an active material unit in which the active material paste, the collector paste, and the active material paste were printed and dried on the solid electrolyte sheet in this order was obtained.

(Making of Trapping Layer Unit)

A trapping layer paste was printed on the solid electrolyte sheet for the outermost solid electrolyte 3B at a thickness of 5 μm by screen printing. The trapping layer paste was printed such that a printing area of a trapping layer unit was 90% of a printing area of the active material unit. Next, the printed trapping layer paste was dried at 80° C. for 5 minutes, and then a PET film was peeled off. In this way, a sheet of the trapping layer unit was obtained.

(Making of Laminate)

The trapping layer 4 was made to be inside the outermost solid electrolyte 3B in a thickness direction, that is, to be close to the active material layer by superimposing nine solid electrolyte sheets for the outermost solid electrolyte 3B and superimposing a sheet of trapping layer unit thereon (including one solid electrolyte sheet 1 for the outermost solid electrolyte 3B). In addition, 50 sheets of active material units (25 sheets of positive electrode active material layer units and 25 sheets of negative electrode active material layer units) were alternately piled up to interpose the interlayer solid electrolyte 3A. In this case, units were piled up in an offset state such that collector paste layers of odd-numbered sheets of active material units extended to one end face only and collector paste layers of even-numbered sheets of active material units extended to the other end face only. A sheet of trapping layer unit was further superimposed on the units that were piled up, and nine solid electrolyte sheets for the outermost solid electrolyte 3B were piled up on the trapping layer unit. Afterward, this was formed by thermocompression, and then was cut to make a laminated block. Afterward, the laminated block was subjected to simultaneous firing to obtain the laminate 5. In the simultaneous firing, the laminated block was raised to a firing temperature of 840° C. in nitrogen at a temperature rising rate of 200° C./hour, was held at the firing temperature for two hours, and was naturally cooled after the firing.

Evaluation of Laminate of Example 1

A surface mapping analysis was made of 100 μm×100 μm areas of lower and upper surfaces of a laminate of Example 1 using a scanning electron microscopy-energy dispersive X-ray spectrometry (SEM-EDS), and a Cu existence percentage (%) at which Cu existed on a surface of the laminate 5 was determined. The Cu existence percentage of Example 1 was 5% that was an average value of the lower and upper surfaces.

Comparative Example 1

Comparative Example 1 was different from Example 1 in that the trapping layer 4 was not formed. The other conditions were the same as in Example 1. A Cu existence percentage of Comparative Example 1 was 60%.

It was confirmed from Example 1 and Comparative Example 1 that Cu that was a metal of which a collector was formed was trapped by the trapping layer 4, and thereby a percentage at which Cu was precipitated onto the surface of the laminate 5 was significantly reduced.

Example 2

Example 2 was different from Example 1 in that, in place of iron oxide ($Fe_2O_3$), chromium oxide ($Cr_2O_3$), manganese oxide ($Mn_2O$), cobalt oxide (CoO), nickel oxide (NiO), zinc oxide (ZnO), lithium oxide ($Li_2O$), lanthanum oxide ($La_2O_3$), titanium oxide ($TiO_2$), or vanadium oxide ($V_2O_5$) was used as another oxide. The other conditions were the same as in Example 1. A Cu existence percentage was 16% of $Cr_2O_3$, 18% of $Mn_2O_3$, 16% of CoO, 14% of NiO, 20% of ZnO, 25% of $Li_2O$, 28% of $La_2O_3$, 27% of $TiO_2$, and 26% of $V_2O_5$.

According to Examples 1 and 2, in a case where the trapping layer 4 contained Fe, Cr, Mn, Co, Ni, or Zn, a trapping effect was high, which was preferable.

Example 3

Example 3 was different from Example 1 in that, in place of iron oxide ($Fe_2O_3$), metal iron (Fe), an iron-chromium alloy (Fe—Cr (40% Cr)), iron phosphate ($FePO_4$), iron nitride ($Fe_3N_2$), iron carbide ($FeCO_3$), or iron hydroxide ($Fe(OH)_2$) was used as another iron form. The other conditions were the same as in Example 1. A Cu existence percentage was 20% of metal Fe, 25% of Fe—Cr, 10% of $FePO_4$, 35% of $Fe_3N_2$, 32% of $FeCO_4$, and 34% of $Fe(OH)_2$.

According to Examples 1 and 3, in a case where the trapping layer 4 contained a metal, an alloy, an oxide, or iron phosphate, a trapping effect was high, which was preferable.

Example 4

Example 4 was different from Example 1 in that a thickness of a trapping layer paste was changed. In Example 1, a ratio of the thickness of the trapping layer paste (5 μm)/a thickness of a collector paste (5 μm) was 1. However, Example 4 was different from Example 1 in that the thickness of the collector paste (5 μm) was constantly maintained, and thus the thickness of the trapping layer paste was variously changed. The other conditions were the same as in Example 1. The results are summarized in Table 1 below. It is conceivable that the trapping layer paste and the collector paste contain the same binder and solvent, and thus are contracted approximately to the same level during firing. Therefore, it is conceivable that the ratio of the thickness of the trapping layer paste/the thickness of the collector paste is approximately the same as that of the thickness of the trapping layer/the thickness of the collector after the firing.

TABLE 1

| Ratio of of thickness of trapping layer/thickness of collector | Cu existance percentage (%) |
| --- | --- |
| 0.001 | 40 |
| 0.003 | 30 |
| 0.010 | 25 |
| 0.033 | 10 |
| 0.333 | 5 |
| 0.667 | 6 |
| 1.00 | 5 |
| 1.67 | 5 |
| 3.33 | 5 |
| 6.67 | 5 |
| 10 | 5 |

Example 5

Example 5 was different from Example 1 in a position of the trapping layer 4 in the outermost solid electrolyte 3B. That is, in Example 5, as the position of the trapping layer 4 in the outermost solid electrolyte 3B, both the middle of the outermost solid electrolyte 3B and the vicinity of the surface 5A or 5B of the laminate 5 were selected. In a case where the trapping layer 4 was located in the middle of the outermost solid electrolyte 3B, five solid electrolyte sheets for the outermost solid electrolyte, a sheet of trapping layer unit, four solid electrolyte sheets for the outermost solid electrolyte, 50 sheets of active material units, five solid electrolyte sheets for the outermost solid electrolyte, a sheet of trapping layer unit, and four solid electrolyte sheets for the outermost solid electrolyte were piled up in turn. On the other hand, in a case where the trapping layer 4 was located in the vicinity of the surface of the laminate 5, one solid electrolyte sheet for the outermost solid electrolyte, a sheet of trapping layer unit, eight solid electrolyte sheets for the outermost solid electrolyte, 50 sheets of active material units, eight solid electrolyte sheets for the outermost solid electrolyte, a sheet of trapping layer unit, and one solid electrolyte sheet for the outermost solid electrolyte were piled up in turn. The other conditions were the same as in Example 1. A Cu existence percentage was 8% of the case where the trapping layer 4 was located in the middle of the outermost solid electrolyte 3B, and 10% of the case where the trapping layer 4 was located in the vicinity of the surface 5A or 5B of the laminate 5.

According to Examples 1 and 5, in a case where the trapping layer 4 existed in the vicinity of the active material layer, the trapping layer 4 was close to the collector, which was preferable.

Example 6

Example 6 was different from Example 1 in that, in place of Cu, Ni was used as a collector. The other conditions were the same as in Example 1. A Ni existence percentage of Example 6 was 4%.

Comparative Example 2

Comparative Example 2 was different from Example 6 in that the trapping layer 4 was not formed. The other conditions were the same as in Example 6. A Ni existence percentage of Comparative Example 2 was 40%.

Example 7

Example 7 was different from Example 2 in that, in place of Cu, Ni was used as a collector. The other conditions were the same as in Example 2. A Ni existence percentage of Example 7 was 12% of $Cr_2O_3$, 16% of $Mn_2O_3$, 14% of CoO, 38% of NiO, 17% of ZnO, 22% of $Li_2O$, 27% of $La_2O_3$, 25% of $TiO_2$, and 23% of $V_2O_5$. In a case where both the collector and the trapping layer 4 contained Ni, a trapping effect was hardly recognized.

Example 8

Example 8 was different from Example 3 in that, in place of Cu, Ni was used as a collector. The other conditions were the same as in Example 3. A Ni existence percentage was 15% of metal Fe, 19% of Fe—Cr, 7% of $FePO_4$, 30% of $Fe_3N_2$, 25% of $FeCO_4$, and 28% of $Fe(OH)_2$.

Example 9

Example 9 was different from Example 4 in that, in place of Cu, Ni was used as a collector. The other conditions were the same as in Example 4. The results are summarized in Table 2 below.

TABLE 2

| Ratio of of thickness of trapping layer/thickness of collector | Ni existance percentage (%) |
|---|---|
| 0.001 | 32 |
| 0.003 | 26 |
| 0.010 | 20 |
| 0.033 | 7 |
| 0.333 | 4 |
| 0.667 | 5 |
| 1.00 | 4 |
| 1.67 | 5 |
| 3.33 | 4 |
| 6.67 | 4 |
| 10 | 4 |

Example 10

Example 10 was different from Example 5 in that, in place of Cu, Ni was used as a collector. The other conditions were the same as in Example 5. A Ni existence percentage was 7% of the case where the trapping layer was located in the middle of the outermost solid electrolyte 3B, and 9% of the case where the trapping layer 4 was located in the vicinity of the surface 5A or 5B of the laminate 5.

Example 11

Example 11 was different from Example 1 in that, in place of Cu, Co was used as a collector. The other conditions were the same as in Example 1. A Co existence percentage of Example 11 was 5%.

Comparative Example 3

Comparative Example 3 was different from Example 11 in that the trapping layer 4 was not formed. The other conditions were the same as in Example 11. A Co existence percentage of Comparative Example 3 was 35%.

Example 12

Example 12 was different from Example 2 in that, in place of Cu, Co was used as a collector. The other conditions were the same as in Example 2. A Co existence percentage was 14% of $Cr_2O_3$, 10% of $Mn_2O_3$, 30% of CoO, 25% of NiO, 20% of ZnO, 28% of $Li_2O$, 24% of $La_2O_3$, 23% of $TiO_2$, and 30% of $V_2O_5$. In a case where both the collector and the trapping layer 4 contained Co, a trapping effect was hardly recognized.

Example 13

Example 13 was different from Example 3 in that, in place of Cu, Co was used as a collector. The other conditions were the same as in Example 3. A Co existence percentage was 18% of metal Fe, 22% of Fe—Cr, 9% of $FePO_4$, 25% of $Fe_3N_2$, 30% of $FeCO_4$, and 33% of $Fe(OH)_2$.

Example 14

Example 14 was different from Example 4 in that, in place of Cu, Co was used as a collector. The other conditions were the same as in Example 4. The results are summarized in Table 3 below.

TABLE 3

| Ratio of of thickness of trapping layer/thickness of collector | Co existance percentage (%) |
|---|---|
| 0.001 | 30 |
| 0.003 | 27 |
| 0.010 | 15 |
| 0.033 | 12 |
| 0.333 | 8 |
| 0.667 | 5 |
| 1.00 | 5 |
| 1.67 | 5 |
| 3.33 | 6 |
| 6.67 | 5 |
| 10 | 6 |

Example 15

Example 15 was different from Example 5 in that, in place of Cu, Co was used as a collector. The other conditions were the same as in Example 5. A Co existence percentage was 9% of the case where the trapping layer 4 was located in the middle of the outermost solid electrolyte 3B, and 12% of the case where the trapping layer 4 was located in the vicinity of the surface 5A or 5B of the laminate 5.

REFERENCE SIGNS LIST

1A Positive electrode collector
1B Positive electrode active material layer
2 Negative electrode layer
2A Negative electrode collector
21 Negative electrode active material layer
3 Solid electrolyte
3A Interlayer solid electrolyte
3B Outermost solid electrolyte
4 Trapping layer
5 Laminate
6 First external terminal
7 Second external terminal

What is claimed is:

1. An all-solid-state secondary battery comprising a positive electrode collector, a positive electrode active material layer, a negative electrode active material layer, a negative electrode collector, and a solid electrolyte,
wherein the solid electrolyte has an interlayer solid electrolyte located between the positive electrode active material layer and the negative electrode active material layer,
the all-solid-state secondary battery further includes a trapping layer configured to trap a metal of which at least one of the positive electrode collector and the negative electrode collector is formed,
and the trapping layer is in the solid electrolyte.

2. The all-solid-state secondary battery according to claim 1, wherein the trapping layer contains one or more metal elements selected from the group consisting of Cr, Mn, Fe, Co, Ni, and Zn.

3. The all-solid-state secondary battery according to claim 1, wherein the trapping layer contains one or more of the group consisting of a metal, an alloy, an oxide, and a phosphorus oxide.

4. The all-solid-state secondary battery according to claim 1, wherein a thickness of the trapping layer is within a ratio range between 0.003 and 6.67 with respect to a thickness of at least one of the positive electrode collector and the negative electrode collector.

5. The all-solid-state secondary battery according to claim 1, wherein:
the solid electrolyte further has an outermost solid electrolyte located outside at least one of the positive electrode collector and the negative electrode collector; and
the trapping layer is located inside the outermost solid electrolyte.

6. The all-solid-state secondary battery according to claim 1, wherein the positive electrode collector, the positive electrode active material layer, the negative electrode active material layer, the negative electrode collector, and the solid electrolyte have a relative density of 80% or more.

7. The all-solid-state secondary battery according to claim 2, wherein the trapping layer contains one or more of the group consisting of a metal, an alloy, an oxide, and a phosphorus oxide.

8. The all-solid-state secondary battery according to claim 2, wherein a thickness of the trapping layer is within a ratio range between 0.003 and 6.67 with respect to a thickness of at least one of the positive electrode collector and the negative electrode collector.

9. The all-solid-state secondary battery according to claim 3, wherein a thickness of the trapping layer is within a ratio range between 0.003 and 6.67 with respect to a thickness of at least one of the positive electrode collector and the negative electrode collector.

10. The all-solid-state secondary battery according to claim 7, wherein a thickness of the trapping layer is within a ratio range between 0.003 and 6.67 with respect to a thickness of at least one of the positive electrode collector and the negative electrode collector.

11. The all-solid-state secondary battery according to claim 2, wherein:
the solid electrolyte further has an outermost solid electrolyte located outside at least one of the positive electrode collector and the negative electrode collector; and
the trapping layer is located inside the outermost solid electrolyte.

12. The all-solid-state secondary battery according to claim 3, wherein:
the solid electrolyte further has an outermost solid electrolyte located outside at least one of the positive electrode collector and the negative electrode collector; and
the trapping layer is located inside the outermost solid electrolyte.

13. The all-solid-state secondary battery according to claim 4, wherein:
the solid electrolyte further has an outermost solid electrolyte located outside at least one of the positive electrode collector and the negative electrode collector; and
the trapping layer is located inside the outermost solid electrolyte.

14. The all-solid-state secondary battery according to claim 7, wherein:
the solid electrolyte further has an outermost solid electrolyte located outside at least one of the positive electrode collector and the negative electrode collector; and
the trapping layer is located inside the outermost solid electrolyte.

15. The all-solid-state secondary battery according to claim 2, wherein the positive electrode collector, the positive electrode active material layer, the negative electrode active material layer, the negative electrode collector, and the solid electrolyte have a relative density of 80% or more.

16. The all-solid-state secondary battery according to claim 3, wherein the positive electrode collector, the positive electrode active material layer, the negative electrode active material layer, the negative electrode collector, and the solid electrolyte have a relative density of 80% or more.

17. The all-solid-state secondary battery according to claim 4, wherein the positive electrode collector, the positive electrode active material layer, the negative electrode active material layer, the negative electrode collector, and the solid electrolyte have a relative density of 80% or more.

18. The all-solid-state secondary battery according to claim 5, wherein the positive electrode collector, the positive electrode active material layer, the negative electrode active material layer, the negative electrode collector, and the solid electrolyte have a relative density of 80% or more.

19. The all-solid-state secondary battery according to claim 7, wherein the positive electrode collector, the positive electrode active material layer, the negative electrode active material layer, the negative electrode collector, and the solid electrolyte have a relative density of 80% or more.

* * * * *